July 23, 1940.
A. RONNING
2,209,093
TRACTOR WHEEL SUSPENSION
Filed Dec. 24, 1938
3 Sheets-Sheet 2
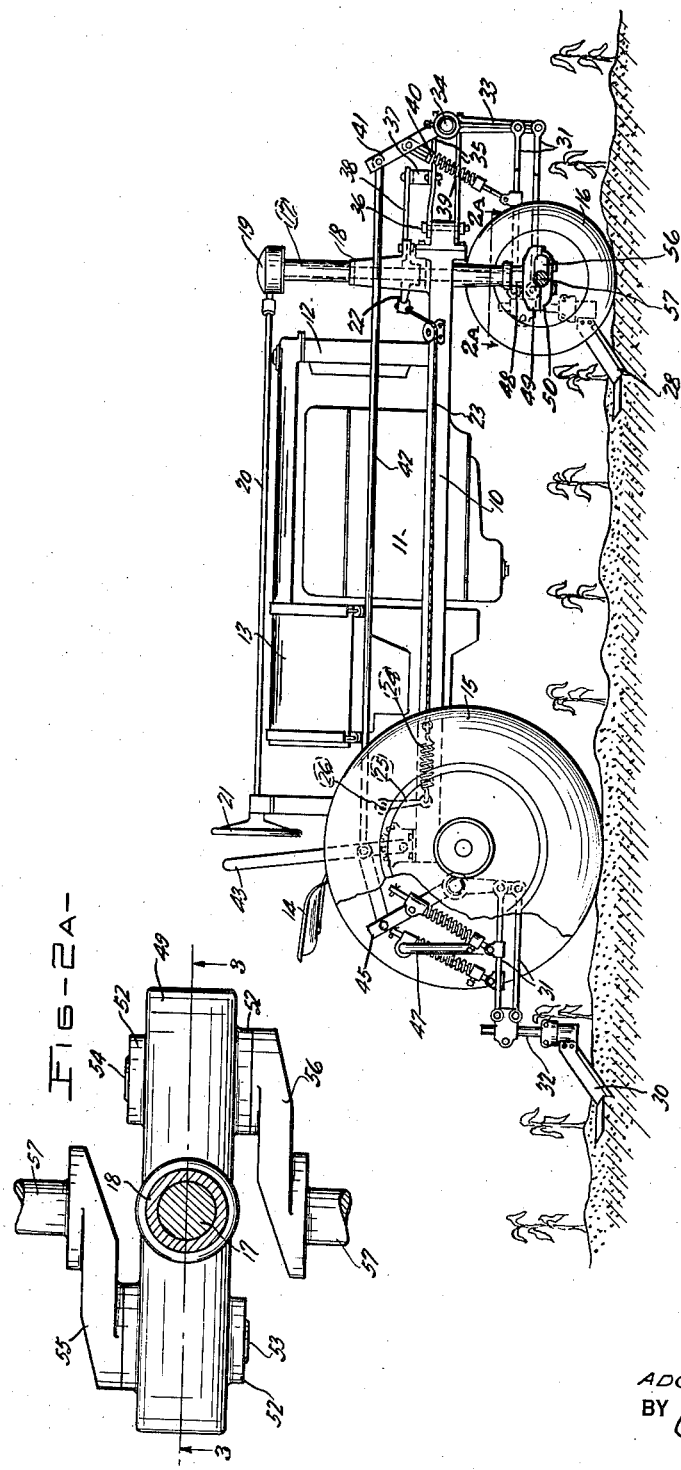
INVENTOR
ADOLPH RONNING
BY Carlsen + Hagle
ATTORNEYS July 23, 1940.  A. RONNING  2,209,093
TRACTOR WHEEL SUSPENSION
Filed Dec. 24, 1938  3 Sheets-Sheet 3
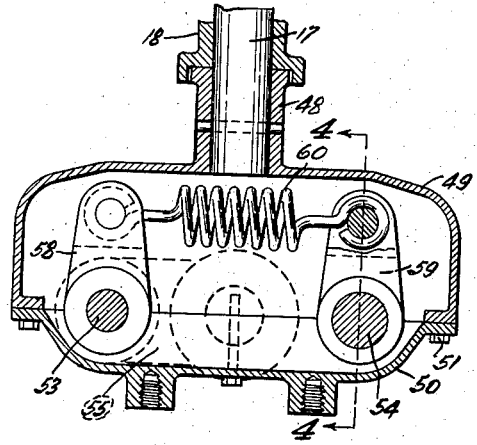
FIG-3-
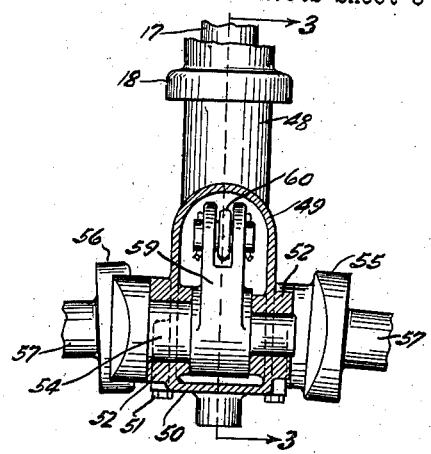
FIG-4-
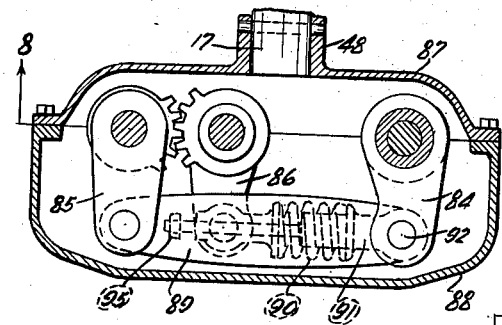
FIG-7-
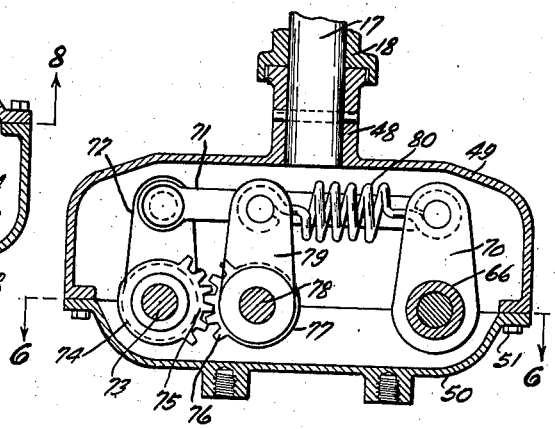
FIG-5-
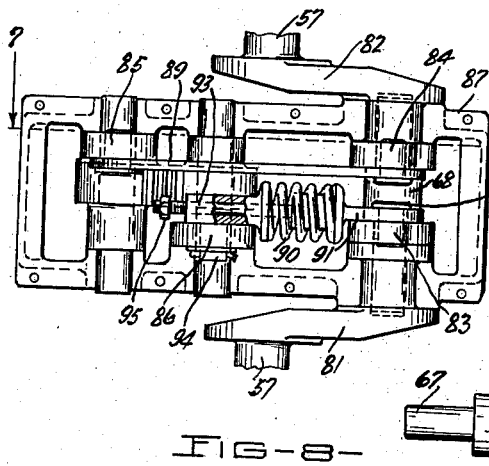
FIG-8-
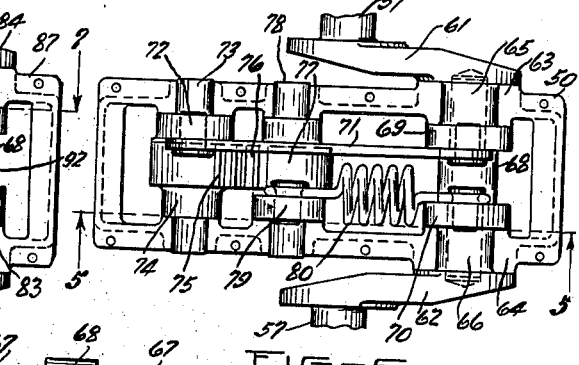
FIG-6-
FIG-9-
INVENTOR
ADOLPH RONNING
BY Carlsen & Hoyle
ATTORNEYS Patented July 23, 1940

2,209,093

UNITED STATES PATENT OFFICE 2,209,093

TRACTOR WHEEL SUSPENSION

Adolph Ronning, Minneapolis, Minn.

Application December 24, 1938, Serial No. 247,608

18 Claims. (Cl. 280—87)

This invention relates to ground wheel suspension arrangements and devices for motor vehicles and particularly for tractors of the type particularly designed for so-called row crop work, and the primary object is to provide such a vehicle with a novel, efficient, and practical wheel mounting arrangement that will distribute the tractor weight through a triangular three point suspension while also distributing the weight properly to four ground wheels including widely spaced rear traction wheels and relatively closely spaced front steering wheels, the relative spacing of wheels being such that the traction wheels may straddle two crop rows while the front or steering wheels travel between the same two rows. A further object is to provide a mounting device for the front or steering wheels, which device includes a differential mechanism that will permit these wheels to move vertically with respect to each other and in constantly spaced vertical planes whereby the forward load is always uniformly distributed to both wheels, and without in any way interfering with the steering operation. Still other and more specific objects will be disclosed in the source of the following specification, reference being had to the accompanying drawings, wherein:

Fig. 1 is a plan view of a cultivator equipped tractor embodying my invention and illustrating the positions of the supporting wheels and cultivator tools with respect to crop rows being cultivated.

Fig. 2 is a side elevation of the tractor shown in Fig. 1, as seen from the right, with the near front steering wheel removed, and with a part of the rear, right traction wheel broken away.

Fig. 2A is an enlarged detail plan view of the front wheel mounting unit, as seen on line 2A—2A in Fig. 2.

Fig. 3 is a longitudinal vertical section through the mounting shown in Fig. 2, as seen on line 3—3 in either Fig. 2A or Fig. 4.

Fig. 4 is a sectional elevation on line 4—4 in Fig. 3.

Fig. 5 is a sectional elevation corresponding to Fig. 3, but showing a modified form of structure, this section being on line 5—5 in Fig. 6.

Fig. 6 is a plan view of the mechanism shown in Fig. 5, with the upper casing partly removed.

Fig. 7 is a section on line 7—7 in Fig. 8, and corresponds with Figs. 3 and 5 but shows a further modification in the differential mechanism.

Fig. 8 is a bottom plan view of the device shown in Fig. 7, with the lower casing section removed.

Fig. 9 is a detail view of a spacer shaft used in the two forms illustrated in Figs. 5-6 and 7-8.

Referring to the drawings more particularly and by reference characters, 10 designates the main frame of a tractor having a power plant 11, radiator 12, gasoline tank 13, operator's seat 14, and widely spaced rear traction wheels 15 both differentially driven by the power plant. At its forward end the tractor is supported on steering wheels 16, by mountings presently to be described, for steering movement about the axis of a vertical central steering post 17 journaled in an upright bearing sleeve 18 secured in the frontal end of frame 10. The post 17 is turned to effect steering, by a worm and worm gear drive contained in housing 19, and the worm element is rotated by a shaft 20 extending rearwardly to a hand wheel 21 within convenient reach of the operator when seated on the seat 14. Thus initial steering action of the tractor is had by angling the wheels 16, on axis of post 17, by manipulating hand wheel 21.

To produce a secondary steering truck, I provide the post 17 with a rearwardly projecting arm 22 which is connected by cables 23, springs 24, and arms 25 of control rods 26 for brakes 27 of the respective traction wheels 15, so that after the wheels 16 have been angled to a predetermined degree or extent then continued turning of the handwheel 21 will operate to brake the traction wheel 15 on the side to which the tractor is being steered, with a result that such wheel will slow up or stop while the opposite wheel will be differentially operated to turn relatively faster. In this manner the brakes are utilized to produce a much sharper turning movement of the tractor than would otherwise be the case.

As illustrated in Fig. 1, the tractor is in working position with respect to two parallel crop rows of a field having similar and equally spaced rows at both sides thereof. Cultivators are shown as mounted on the tractor for cultivating the two intermediate rows, and when the machine reaches the end of the field it is of course sharply turned and its direction is reversed so that the next two adjacent rows, at either side, may be similarly cultivated. In the present instance the cultivator includes two pairs of forward shovels 28 which work the earth at both sides of the two rows, and three shovels 29 and 30 at the rear of the tractor. The shovel 29 operates centrally between the rows to cultivate an intermediate strip directly rearward of the wheels 16, and the shovels 30 work the earth directly behind the traction wheels 15. The shovels 28, 29, and 30 are all of the type more specifically disclosed in my copending application Serial No. 226,941, filed August 26th, 1938, for Cultivator; and in the present instance are shown as supported by parallel, vertically adjustable, drag bars 31 which are so arranged that while subject to vertical adjustments will always retain the shovel shanks 32 in vertical positions and the shovels at set angles regardless of working depth.

The frontal drag bars 31 are pivotally connected, at their forward ends, to depending arms 33 of a cross bar 34. This bar is swingable supported, for transverse shifting with respect to the tractor, by links 35, secured to frame 10 as at 36, and the shifting movement is effected by a link 37, connecting one of the links 35 to an arm 38 extending forwardly from the steering shaft 17 so as to oscillate therewith. Thus transverse shifting of the front cultivators is accomplished simultaneously with steering of the truck wheels 16.

To provide vertical adjustment for the forward cultivators I connect the upper of each pair of drag bars 31 by a telescopic spring link 39 to a cross piece 40 of an arm 41 which is pivoted at its lower end to bar 34, while the upper end is connected to and operated by a rod 42 extending to the rear of the tractor. Each rod 42 thus controls one pair of shovel units, and the spring links 39 are so designed that while they serve to lift the bars 31 and shovels 28 they are also free to compress in order that the shovels may ride over stones or other obstructions encountered in the field. The rear ends of the rods 42 are connected to hand levers 43, mounted on the tractor within convenient reach of the operator, and these levers also and similarly control the rear cultivator tools 30 through the medium of links 44, arms 45, and spring links 46. The center tool, 29, is adjusted through an arched bar 47 secured at its opposite ends to the outer cultivator rigs.

Referring to Figs. 2A, 3, and 4, showing one form of the steering wheel truck combination, it will be noted that the steering post 17 extends below the bearing sleeve 18 in which it is journaled, and is fixed in the collar 48 of a housing section 49 having a complemental section 50 secured thereto by bolts 51. The plane of division between the housing sections 49 and 50 diametrically bisects bearing hubs or parts 52 having complemental recesses in which are journaled shafts 53 and 54, respectively, of crank arms 55 and 56, provided at their ends opposite from the shafts with spindles 57 on which are mounted the ground wheels 16. As shown in Fig. 2A the cranks extend in opposite longitudinal directions so that the spindles 57 will be directly or transversely opposite of each other, and will also be understood that as the cranks oscillate up and down the ground wheels can only move in vertical longitudinal planes which retain a fixed transverse spacing at all times and regardless of the relative vertical positions of the wheels. As all of the differential mechanism, presently to be described, is carried within the housing and by the two shafts 53 and 54, it will be understood that by removing the bolts 51 and lowering the housing section 50 the shafts and mechanism will follow, thus greatly facilitating disassemblage and reassemblage of the truck unit.

Within the housing the crank shafts 53 and 54 are provided with integral, upstanding arms 58 and 59 that are connected by a coil spring 60. This spring is sufficiently strong so that it will operate as a connecting link between the arms while also having limited flexibility whereby it will impart a shock absorbing or cushioning resistance to the upward pressure of the ground wheels, it being understood that the tractor weight will be imposed on the crank shafts 53 and 54 in a manner that will create a spreading pressure between the arms 58 and 59 to tension the spring 60. It will also be understood, however, that while such weight pressure is being imposed it will in no wise prevent relative vertical movements of the wheels 16 as they pass over irregular ground surfaces, such movements being compensated by the differential or equalizing action of the mechanism within the housing.

In the modification illustrated in Figs. 5 and 6 a housing 48—51 similar to that shown in Figs. 2-4 is employed, but in this case the cranks 61 and 62 are mounted for coaxial swinging movement, both extending rearwardly from their respective recessed bearings 63 and 64. In this instance the cranks are provided with short hubs 65 and 66 which are center bored to receive the reduced ends 67 (see Fig. 9) of a spacer shaft 68 which thereby serves to more firmly establish a mutual bearing support as between the crank hubs.

The inner ends of the hubs 65 and 66 have integral upstanding arms 69 and 70, the first of which is connected by a link 71, of constant length, to an arm 72 of a shaft 73 journaled between the housing sections. An integral hub 74, of the arm 72 and shaft 73, has a gear segment 75 which meshes with a similar gear segment 76 on the hub 77 of a shaft 78 also journaled between the housing sections and having an upstanding arm 79. The arms 70 and 79 are connected by a spring 80, which functions in a manner similar to the aforesaid spring 60, to yieldably connect the arms. The purpose of the arm and gear arrangement just described is to provide proper stress application to the spring, which is necessary because of the fact that the cranks 61 and 62 are coaxially journaled and both extend rearwardly instead of in opposite directions as in Figs. 2–4.

The form of the invention illustrated in Figs. 7 and 8 constitutes a rearrangement of parts as shown in Figs. 5–6 so as to utilize the cushioning properties of a compression spring in preference to tension springs as above described. In this instance the cranks 81 and 82 also extend rearwardly from the spacer shaft 68, but the inner crank arms 83 and 84 extend downwardly instead of upwardly, as do also the gear connected arms 85 and 86 which effect the differential action. For this reason the plane of separation between the housing sections 87 and 88 is higher than in Figs. 3–6, so as to bisect the shaft bearing recesses and facilitate assembly of the unit. Because of the link connection 89 between arms 84 and 85 it will be seen that the weight of the tractor on the wheel spindles will tend to move the lower ends of the arms 83 and 86 toward each other, and to yieldably resist or support such weight I therefore insert a compression spring 90 between these arms. The spring encircles a guide rod 91, one end of which is pivoted as at 92 to the arm 83, while the other end is slidable in an abutment 93 pivoted to arm 86 as at 94. The last mentioned end of the rod extends through the abutment and is provided with an adjustable stop nut 95 to limit the spread between arms 84 and 86, thus also limiting down movement of both wheels with respect to the tractor. The differential mechanism illustrated in Figs. 7 and 8 will, as in the previously described forms, operate to equally distribute the tractor weight to both steering wheels while also permitting full floating action of the wheels in order that they may follow different ground contours and be easily steered at all times.

For the disclosure of other forms of steering wheel differential mountings, per se, attention is directed to my copending companion applications Serial No. 219,369, filed July 15th, 1938; Serial No. 242,725, and Serial No. 242,726, both filed November 28th, 1938; and Serial No. 244,019, filed December 5th, 1938.

The advantages that result from the use of the differentially actuated steering wheels when used with tractor carried tools such as the row crop cultivator shown, may be noted as follows: In the first place it is found that inasmuch as the imposed weight of tractor and tools is equally distributed to both wheels at all times, and the wheels are free to move freely in opposite vertical directions in accordance with ground surface irregularities, steering of the tractor and corresponding shifting of the tools, when following crooked rows, is greatly facilitated. Secondly, and of equal importance, is the fact that the opposite vertical movements of the wheels 16 operate to produce a more uniform operating depth of the tools. This can best be understood by comparison with modern tractor-cultivator combinations, in which quite similar arrangements are found except that the closely spaced steering wheels are invariably mounted for rotation about relatively fixed axes, and cannot move vertically with respect to each other. In such instances it will be seen that when one of the wheels rides over an obstruction for example eight inches above the surface or path of travel of the other wheel then both wheels will of necessity be raised eight inches and the cultivator tools carried by the front end of the tractor will be correspondingly raised eight inches. In the present instance, however, and where any one of my differentially actuated wheel units are used, if one wheel rides over an eight inch high obstruction the other will still remain on the normal surface level, and as a result the steering post, front tractor end, and cultivator tools will be lifted only one half the height of the obstruction, or four inches. Thus it will be seen that the tools, working at a desired and predetermined depth below the surface will be maintained at that depth more uniformly and consistently than would otherwise be the case, and this is considered a valuable feature of my invention.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle, a steerable truck therefor comprising a housing mounted for turning movement about a generally upright axis and having bearings in the side walls thereof, said housing having upper and lower detachably connected sections the plane of division between which extends through said bearings, and wheel supported differentially connected cranks journaled in said bearings.

2. A vehicle supporting truck comprising upper and lower detachably connected housing sections one of which is designed for direct attachment to the vehicle, adjoining edges of said sections being formed with complemental bearing parts adapted to be opened by separating said sections, wheel supported cranks journaled in the bearings thus formed, and differential mechanism connecting the cranks within the housing causing the cranks to move in opposite vertical directions as said wheels travel over irregular ground surfaces.

3. A vehicle supporting truck comprising upper and lower detachably connected housing sections one of which is designed for direct attachment to the vehicle, adjoining edges of said sections being formed with complemental bearing parts adapted to be opened by separating said sections, wheel supported cranks journaled in the bearings thus formed, and differential mechanism connecting the cranks within the housing, said differential mechanism including at least one shaft journaled in complemental bearing recesses extending into both of said housing sections whereby to release such shaft and permit removal thereof when the housing sections are separated.

4. In a vehicle, a mounting member, a pair of cranks journaled in the member, a pair of axially aligned wheels secured to the cranks, arms extending upwardly from said cranks, and differential acting means connecting the upper ends of said arms, said means including a resilient element.

5. In a vehicle, a mounting member, wheel supported cranks journaled in the member at opposite sides thereof, arms extending upwardly from said cranks within the mounting member, and means including a yieldable element connecting the upper ends of said arms and actuating the same to move the cranks in opposite vertical directions.

6. In a vehicle, a mounting member, wheel supported cranks journaled in opposite sides of said member for movements in transversely spaced planes, arms connected with the cranks and extending generally upwardly from axes of oscillation, and means including a spring connected with the upper ends of said arms tending to hold them in predetermined relative positions but causing them to move in unison to differentially actuate the cranks in opposite directions.

7. In a vehicle, a mounting member, wheel supported cranks journaled in said member, arms connected with the cranks and extending generally upwardly from axes of oscillation, and means including a spring connected with said arms tending to hold them in predetermined relative positions but causing them to move in unison to differentially actuate the cranks in opposite directions, said cranks being journaled for rotation on longitudinally spaced axes.

8. In a vehicle, a mounting member, wheel supported cranks journaled in said member, arms connected with the cranks and extending generally upwardly from axes of oscillation, and means including a spring connected with said arms at points spaced from their axes of oscillation and tending to hold the arms in predetermined relative positions but causing them to move in unison to differentially actuate the cranks in opposite directions, said cranks being journaled for rotation about a common axis.

9. In a vehicle, a pair of coaxially journaled wheel supported cranks, a pair of gear connected arms pivoted eccentrically with respect to said cranks, and operating connections between the cranks and arms.

10. In a vehicle, a pair of fulcrumed cranks having upwardly extended arms, normally axially aligned wheels supporting the cranks, and differential acting means connecting the arms at points spaced from the crank fulcrums to actuate the cranks in opposite vertical directions, said means including a yieldable element.

11. In a vehicle, a mounting member, a pair of wheel supported cranks coaxially journaled in the mounting member for movements in transversely spaced planes, a pair of arms swingably secured to the mounting member and connected for oscillating movements in opposite directions, and operating connections between the arms and the respective cranks.

12. In a vehicle, a mounting member, a pair of wheel supported cranks coaxially journaled in the mounting member for movements in transversely spaced planes, a pair of arms swingably secured to the mounting member and connected for oscillating movements in opposite directions, and operating connections between the arms and the respective cranks, one of said operating connections including a yieldable element.

13. In a vehicle, a steerable member mounted for movement about a vertical axis, a pair of wheel supported cranks coaxially journaled in the member, one at each side thereof, arms extending from the resepctive cranks, a pair of members pivoted to the steerable member at spaced positions with respect to said arms and interconnected for oscillating movements in opposite directions, and operating connections between the respective interconnected members and said arms, one of said connections including a yieldable tension element.

14. In a vehicle, a steerable member mounted for movement about a vertical axis, a pair of wheel supported cranks coaxially journaled in the member, one at each side thereof, arms extending from the respective cranks, a pair of members pivoted to the steerable member at spaced positions with respect to said arms and interconnected for oscillating movements in opposite directions, and operating connections between the respective interconnected members and said arms, one of said connections including a yieldable compression element.

15. In a vehicle, a steerable member mounted for movement about a vertical axis, a pair of wheel supported cranks coaxially journaled in the member, one at each side thereof, arms extending from the respective cranks, a pair of members pivoted to the steerable member at spaced positions with respect to said arms and interconnected for oscillating movements in opposite directions, and operating connections between the respective interconnected members and said arms, one of said connections including an adjustable element.

16. A vehicle supporting truck comprising upper and lower detachably connected housing sections one of which is designed for direct attachment to the vehicle, adjoining edges of said sections being formed with complemental bearing parts adapted to be opened by separating said sections, wheel supported cranks journaled in the bearings thus formed, and differential mechanism connecting the cranks within the housing causing the cranks to move in opposite directions as said wheels travel over irregular ground surfaces.

17. In a vehicle, a mounting member, wheel supported cranks journaled in the member at opposite sides thereof, arms extending upwardly from said cranks within the mounting member, and means including a yieldable element connecting said arms and actuating the same to move the cranks in opposite directions.

18. In a vehicle, a pair of wheel supported crank members, arms extending from the members, and a pivotally mounted member operatively interposed between said arms, said pivotally mounted member and said arms all being movable in parallel planes.

ADOLPH RONNING.